United States Patent [19]
Anderson et al.

[11] Patent Number: 5,952,084
[45] Date of Patent: Sep. 14, 1999

[54] TRANSPARENT SUBSTRATE PROVIDED WITH A THIN-FILM COATING

[75] Inventors: Charles-Edward Anderson, Courbevoie; Jean-Paul Rousseau, Boulogne, both of France

[73] Assignee: Saint Gobain Vitrage, Courbevoie, France

[21] Appl. No.: 08/804,187

[22] Filed: Feb. 21, 1997

[30] Foreign Application Priority Data

Feb. 22, 1996 [FR] France ................................. 96 02194

[51] Int. Cl.$^6$ .......................... B32B 17/06; B32B 7/02
[52] U.S. Cl. .................. 428/212; 359/359; 359/580; 359/585; 359/586; 359/588; 428/432; 428/433; 428/697; 428/699; 428/701; 428/702
[58] Field of Search .................. 428/212, 697, 428/699, 701, 702, 704, 432, 433; 359/359, 580, 585, 586, 588

[56] References Cited

U.S. PATENT DOCUMENTS

| | | | |
|---|---|---|---|
| 3,935,351 | 1/1976 | Franz | 428/433 |
| 5,254,392 | 10/1993 | Burns et al. | 428/432 |
| 5,332,618 | 7/1994 | Austin | 428/216 |
| 5,342,676 | 8/1994 | Zagdoun | 428/702 |
| 5,645,923 | 7/1997 | Matsuo et al. | 428/701 |
| 5,776,603 | 7/1998 | Zagdoun et al. | 428/336 |

*Primary Examiner*—Archene Turner
*Attorney, Agent, or Firm*—Pennie & Edmonds LLP

[57] ABSTRACT

The subject of the invention is a transparent substrate (1), in particular a glass substrate, including a coating (6) of one or more thin films on at least one of its faces, comprising at least one A film containing an aluminum fluoride or aluminum oxyfluoride $Al_xO_yF_z$, with $y \geq 0$.

14 Claims, 1 Drawing Sheet

TRANSPARENT SUBSTRATE PROVIDED WITH A THIN-FILM COATING

BACKGROUND OF THE INVENTION

The invention relates to transparent substrates, in particular glass substrates, which are provided with coatings composed of one or more thin films which have interference-scale thicknesses and are designed to give specific properties to the substrates which bear them, for example, thermal, optical or electrical properties.

The invention also relates to the use of these coated substrates, in particular to produce glazing, as well as to the method of obtaining them.

The coatings mentioned above therefore consist of stacks of films with varied chemical composition and properties. They are most often dielectric films, for example of the metal oxide or nitride or silicon oxide type, and/or conductive films, for example films of metal such as silver or doped metal oxide. For optical reasons, in many cases these coatings include films whose refractive index is to be carefully selected.

A type of coating, referred to as an anti-reflection coating, is thus known which usually consists of an alternating sequence of dielectric films with high and low refractive indices. Deposited on a transparent substrate, a coating of this type has the function of reducing the light reflection factor of this substrate, and therefore of increasing its light transmission factor. A substrate coated in this way will thus have an increase in its transmitted-light/reflected-light ratio, which improves the visibility of objects placed behind it. It can then be used in many applications, for example to protect a picture illuminated by a light placed behind the observer, or to constitute or form part of a shop window, in order more clearly to discern what is contained in the window, even when the interior lighting is low compared to the exterior lighting, or alternatively in interior furniture or as an anti-glare screen arranged in front of computer screens.

The performance of an anti-reflection coating can be measured or evaluated on the basis of various criteria. Firstly, of course, are the optical criteria. It may be considered that a "good" anti-reflection coating should be able to lower the light reflection factor of a standard clear glass substrate to a given value, for example 2%, or 1% and less. Similarly, it may be important for this coating to keep a satisfactory colorimetry for the substrate, in particular in reflection, for example an extremely neutral one which is very close to that of the bare substrate. Other criteria may also be taken into account depending on the application which is envisaged, in particular the chemical and/or mechanical durability of the coating, the cost of the materials which are used, the manufacturing time or the techniques to be used for manufacturing it.

In this type of anti-reflection stack, as in others, it must therefore be possible to manufacture films of material with low refractive index, for example with an index of less than 1.65.

Various materials currently meet this criterion. Mention may be made of magnesium fluoride $MgF_2$, with an index of about 1.38, which can be deposited in the form of a thin film by a technique of the vacuum evaporation type. This is a technique which is reliable for deposits on small surfaces, for example surfaces of spectacles or lenses, but becomes expensive and complicated when deposition on larger surfaces is involved, for example on glazing.

Silicon oxide $SiO_2$, with a refractive index of about 1.45, may also be mentioned. This material can be deposited using a cathodic sputtering technique, which technique is entirely suitable for deposits on large surfaces of the glazing type. However, it is not very easy to deposit $SiO_2$ by reactive sputtering in the presence of oxygen. Further to the fact that it is necessary to dope the silicon target with another element, in particular boron or aluminium, the deposition rate of the $SiO_2$ film when using this technique is low, and the deposition conditions are sometimes difficult to stabilize and control.

SUMMARY OF THE INVENTION

The object of the invention is therefore to overcome these drawbacks, by seeking a novel type of material with low refractive index, which can be deposited, on an industrial scale, in the form of a high-quality thin film, with a manufacturing method which is satisfactory, in particular in terms of cost, ease of use and/or efficiency.

The subject of the invention is a transparent substrate, in particular a glass substrate, which includes a coating of one or more thin films on at least one of its faces. This coating comprises at least one film containing an aluminium fluoride or an aluminium oxyfluoride $Al_xO_yF_z$ (with $y \geq 0$) which film will hereafter be denoted, by convention and for the sake of convenience, by the term "A film". This material actually has several advantages, primarily in terms of its manufacturing process: aluminium fluoride or aluminium oxyfluoride can in fact be deposited in a thin film using a vacuum technique of the cathodic sputtering type, optionally magnetic field-enhanced cathodic sputtering.

DETAILED DESCRIPTION OF THE INVENTION

Figure 1:
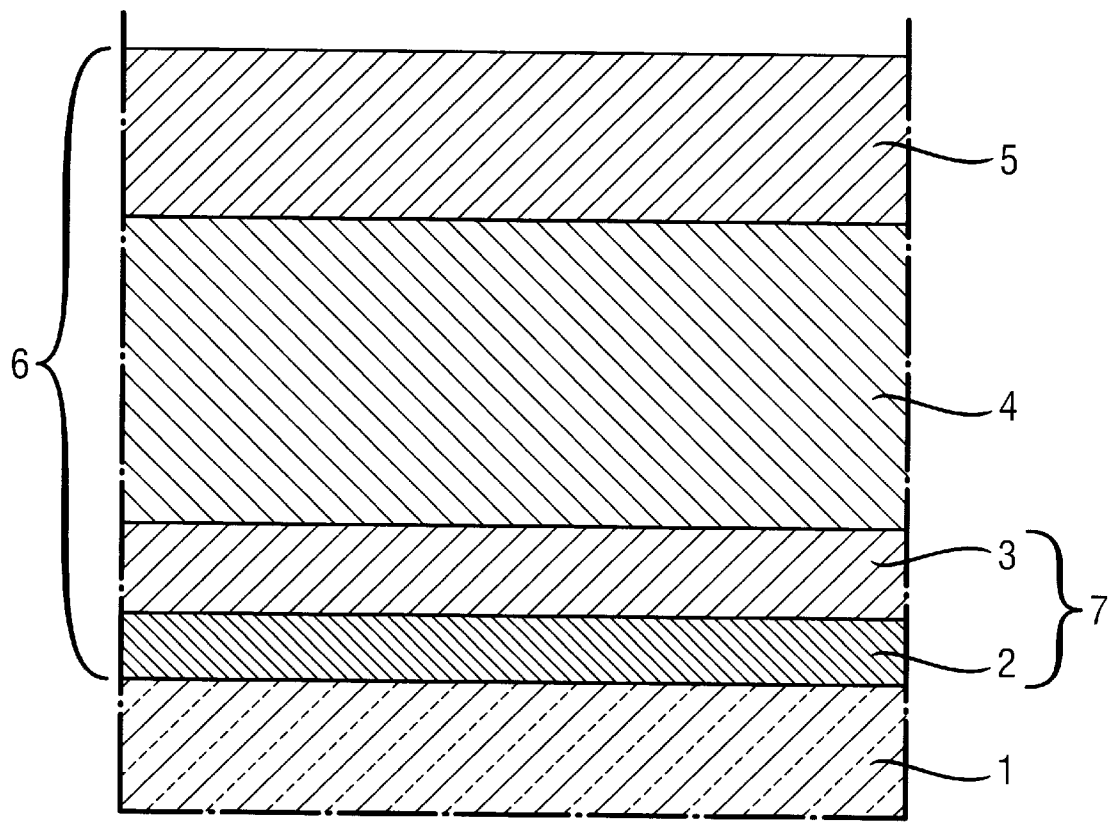
FIG. 1 is a schematic view of a section of a substrate covered with an anti-reflection stack employing at least one A film according to the invention.

In contrast to a technique of the thermal evaporation type, the cathodic sputtering technique is of great benefit; it makes it possible to mass-produce complex thin-film stacks by successive deposits on the same production line, and can be adapted to widely varying substrate sizes, in particular large sizes; it is thus entirely appropriate for manufacturing coatings for windows intended for the building or automotive industries.

Furthermore, using a technique of this type for depositing aluminium oxyfluoride does not entail problems: in contrast to silicon oxide deposition, in which use is made of a low-conductivity silicon target which must be doped, a standard metal target made of aluminium is used in this case (the term "standard" target is intended to mean a plane geometrical configuration for the target, as opposed to rotationally cylindrical targets, which may clearly also be used). The A film is then deposited in a reactive atmosphere comprising an oxidizing gas, such as oxygen, and a fluorinated gas, with a standard DC electrical supply. The deposits thus produced are to a great extent reproducible and easy to control. Furthermore, the deposition rate of a film of this type is much higher than that of an $SiO_2$ film deposited by sputtering, and is high enough to make it fully compatible with the short manufacturing time requirements relevant to mass production of coatings, more particularly for glazing.

Furthermore, the A film manufactured in this way, which is of high quality, is also advantageous in terms of its optical properties: pure aluminium oxide $Al_2O_3$ has a refractive index of about 1.65. By introducing fluorine to obtain an oxyfluoride, or even by fully substituting fluorine for oxygen to obtain a fluoride, the index of the film can be reduced in controlled fashion, since the refractive index of the film decreases as its fluorine content increases. By adapting the deposition conditions, and in particular by altering the level of fluorinated gas relative to the oxidizing gas in the cathodic-sputtering deposition atmosphere, an A film with variable fluorine level can be obtained, up to complete fluorine saturation in the absence of oxidizing gas, the index of which film can be set very accurately within a wide range of values. The index of the A film is thus chosen to be less than 1.63, and is preferably chosen between 1.60 and 1.32, in particular between 1.35 and 1.45. This flexibility in terms of the choice of refractive index makes the A film very beneficial because it can be adapted as a function of the optical role which it is intended to fulfill within a given thin-film stack. In the formula $Al_xO_yF_z$, the equation: $3x=2y+z$ is satisfied, it being understood that "y" is allowed to be greater than or equal to zero.

The level of fluorine in the A film can thus be advantageously chosen so that the F/Al atomic ratio in the film is between 0.1 and 3.0, in particular between 0.10 and 2.50, preferably between 0.16 and 2.45. Similarly, the O/F atomic ratio can be adjusted so that it is between 0 and 10, in particular between 0.1 and 10, preferably between 0.15 and 9.

Various considerations may also lead to elements other than oxygen, fluorine and aluminium being introduced into the A film. This may, in particular, involve an oxide or a mixture of oxides, preferably belonging to the following group: silicon oxide $SiO_2$, tin oxide $SnO_2$, nickel oxide NiO.

Since all these oxides have an index of at most 1.9, adding them to the film may be an additional means of adjusting the index of the film, as a function of its fluorine content, without increasing it in undesirable proportions. They may furthermore have a good influence on the mechanical or chemical durability of the film, which may prove important when the A film is the outermost film in the film stack of which it forms part, and therefore, in fact, when it may be exposed directly to attack such as mechanical abrasion, exposure to corrosive chemical products or unfavourable weather conditions.

A low silicon oxide content thus provides an improvement in the chemical durability of the A film, in particular an increase in its resistance to moisture. The A film advantageously comprises a mixture of aluminium fluoride or aluminium oxyfluoride/silicon oxide. In this case, it is preferable to choose an Si/Al atomic ratio of between 0.05 and 1.00, preferably between 0.06 and 0.10; an O/F atomic ratio of between 0.2 and 10, and preferably between 0.25 and 8.70, and an F/Al atomic ratio of between 0.1 and 2.5, preferably between 0.18 and 2.40.

According to a first, non-limiting embodiment, the A film forms part of a thin-film stack with reflection properties in the infrared and/or in the solar radiation range, in particular stacks comprising at least one metal film, of the silver type, arranged between two dielectric coatings. In view of its low refractive index, it is particularly well-suited for acting as an intermediate film with a lower index than the substrate, and arranged between the substrate and the stack, as described in patent EP-0,745,569.

According to another non-limiting embodiment of the invention, the A film forms part of an anti-reflection coating including an alternating sequence of dielectric films with high and low reflective indices, at least one of the low-index films in the stack consisting of an A film. This may be the last film in the anti-reflection coating, or alternatively all the low-index films therein.

In the context of the invention, the term "low index" is intended to mean refractive indices of between 1.65 and 1.32, in particular less than 1.60, and the term "high index" is intended to mean refractive indices of at least 1.60, in particular between 1.9 and 2.45.

Using films of the A type as low-index films in an anti-reflection coating is actually quite advantageous: it may be substituted for the silica films conventionally used in this type of coating. It is then possible to make two different choices: either the A film has a fluorine level selected so that it has an index close to that of silica, that is to say close to 1.45 In this case, one material has been "replaced" by another material which is easier to deposit by cathodic sputtering but is optically equivalent in the anti-reflection stack. Alternatively, the A film is chosen so that it has a substantially lower index than silica, in particular less than 1.40, for example of the order of 1.37 to 1.38. In this case, it allows a much wider choice of possible high-index materials. Considering in broad outline the method of evaluating the performance of an anti-reflection coating, it can be stated that the capacity of such a coating to lower the light reflection factor value of the substrate bearing it is correlated with the difference between the refractive indices of the high- and low-index films which form the stack, and more particularly with the difference between the indices of the last two high- and low-index films therein. It has to date been conventional to combine a high-index film of the titanium oxide type, that is to say one having an index of at least 2.25, with a low-index silica film. As soon as a material with lower index becomes preferable to silica, it is acceptable for the high-index films used to be films of a material with relatively lower index, for example simply at least 1.9 to 2.2, without sacrificing the optical performance of the anti-reflection coating.

Thus, the anti-reflection coating which includes at least one film of type A as a low-index film, may use high-index films, of actually very high index, of at least 2.25 such as niobium oxide, $Nb_2O_5$, zirconium oxide $ZrO_2$, titanium oxide $TiO_2$, bismuth oxide $Bi_2O_3$ or cerium oxide $CeO_2$. But it is nevertheless possible to employ high-index films with slightly lower index, in particular of the order of 1.90 to 2.20, for example tungsten oxide $WO_3$, tin oxide $SnO_2$, zinc oxide ZnO, aluminium nitride AlN, silicon nitride $Si_3N_4$ or tantalum oxide $Ta_2O_5$. Even with this type of material, a refractive index difference of at least 0.5, in particular about 0.8, may actually be maintained between high- and low-index films. It may also be industrially beneficial, for example, to use $WO_3$ or $SnO_2$ rather than $Nb_2O_5$ or $TiO_2$ as a high-index film, in particular because the former films have a much greater cathodic-sputtering deposition rate than the latter.

Furthermore, the use in anti-reflection stacks of A films having a lower index than silica presents two additional advantages in terms of optics, and more particularly in terms of the calorimetric appearance in reflection: the residual colour in reflection of the coated substrate is made more neutral, and the variations in colour as a function of the angle of incidence at which the coated substrate is observed are found to be much less.

An anti-reflection coating according to the invention, comprising at least one A film, may comprise only two successive sequences of high- and low-index films. Four films may in fact be sufficient to obtain a remarkable anti-reflection effect.

Examples of an anti-reflection coating having this configuration may thus be stacks of the type:

$SnO_2/SiO_2/Nb_2O_5$/A film or
$SnO_2$/A film/$Nb_2O_5$/A film.

The $Nb_2O_5$ films may also be advantageously replaced by $SnO_2$, $WO_3$, $Bi_2O_3$ or $TiO_2$ films.

According to another configuration, the anti-reflection stack may comprise not two but three sequences of high- and low-index films. The anti-reflection effect may then be even greater and combined with a more neutral residual colour in reflection, but manufacturing the stack takes a little longer and is slightly more expensive.

According to another configuration, the first sequence of high- and low-index films in the anti-reflection coating (the term "first sequence" is used to denote the sequence closest to the surface of the substrate bearing the coating), is substituted by a single film having an intermediate refractive index of between 1.65 and 1.80. An intermediate-index film of this type has an optical effect similar to that of a high-index film/low-index film sequence and has the advantage of reducing the overall number of films in the stack.

According to yet another configuration, at least one of the so-called high-index films in the anti-reflection stack, and in particular the film in the second sequence, may be a high-index "overall" film, the term "overall" indicating that it is in fact a superposition of high-index films, in particular two or three. In terms of optics, this "overall" film broadly fulfils the role of a single film with an index intermediate between the refractive indices of the various films which form it.

It is thus possible to have stacks of the type:
glass/$SnO_2$/A film/$Bi_2O_3$/$SnO_2$/$Bi_2O_3$/A film or
glass/$SnO_2$/A film/$Nb_2O_5$/$SnO_2$/A film.

The anti-reflection stack can thus be given an additional anti-static function by incorporating a film of a conductive material in the stack, in particular a material of the doped metal oxide type, such as tin-doped indium oxide ITO.

Each of the faces of the substrate is preferably covered with an anti-reflection stack of this type, in order to obtain the maximum anti-reflection effect.

With the anti-reflection stacks described above, a reduction in the light reflection factor values $R_L$ of the substrates is achieved to values of at most 2%, in particular at most 1% or at most 0.5%. This provides an aesthetic and pleasant calorimetric appearance in reflection, in particular subtle blue or blue-green tints, which is expressed in the (L*, a*, b*) colorimetry system by negative a* and b* values of at most 3.5 in absolute value for a* and at most 1.5 in absolute value for b*.

A further subject of the invention is coatings which, further to at least one film of type A, comprise at least one film with given thermal properties, in particular with a sun-protection property or with low emissivity, of the metal type, such as silver or aluminium, or of the doped metal oxide type, for example fluorine-doped tin oxide $SnO_2$:F or tin-doped indium oxide ITO.

A further subject of the invention is glazing incorporating the coated substrates, irrespective of whether they are monolithic, laminated, or multiple with one or more intermediate gas layers.

This glazing can be used either as interior or exterior windows for buildings or as glass for protecting an object, such as a picture, shop-window display, glazed furniture such as a counter or refrigerated display window, etc., or as motor-vehicle windows such as a laminated windscreen, as mirrors, anti-glare screens for computers, or decorative glass.

A further subject of the invention is the method for manufacturing transparent substrates, in particular glass substrates, with coatings containing A films. One method consists in depositing all the films, successively one after the other, using the vacuum technique, in particular by magnetic field-enhanced cathodic sputtering. It is thus possible to deposit the oxide films by reactive sputtering of the metal in question in the presence of oxygen, the nitride films in the presence of nitrogen, and the A films by reactive sputtering from a target containing aluminium, in the presence of fluorinated gas in order to obtain a fluoride, and in the presence of fluorinated gas and oxidizing gas, such as oxygen, in order to obtain an oxyfluoride.

It is not, however, ruled out that some of the films in the stack, with the exception of the A films, be deposited by another technique employing a vacuum, or by a technique of the pyrolysis type, in particular the first film in the stack (or the first two) directly in contact with the substrate bearing the coating, when this substrate is made of glass.

The invention places no limitation in terms of the nature of the transparent substrate bearing the coating, which may therefore be made of glass or plastic.

The advantageous characteristics and details of the invention will presently emerge from the following non-limiting examples, with reference to FIG. 1.

This figure very schematically represents a section of a substrate covered with an anti-reflection stack employing at least one A film according to the invention (for the sake of clarity, the relative proportions of the substrate and film thicknesses have not been respected). In fact, each of the faces of the substrate is provided with an identical stack, but for simplicity only a single stack has been represented. Throughout the following examples, a coating was used on each of the faces of the substrate.

It should be pointed out that, in these examples, the successive thin-film deposits were made by magnetic field-enhanced reactive cathodic sputtering.

The substrates on which the anti-reflection coatings are deposited are clear silica-soda-lime substrates of the Planilux type marketed by Saint-Gobain Vitrage, with a thickness of 3 to 6 mm, in particular 4 mm.

FIG. 1 represents the glass substrate 1 which, according to a first embodiment, is coated on its two faces with a four-film stack 6 including an alternating sequence of high-index thin films 2, 4 and low-index thin films 3, 5.

A first series of examples was carried out with niobium oxide in film 4 and tin oxide in film 2 for the high-index films:

EXAMPLE 1

This example uses a four-film coating composed of the following sequence (the geometrical thicknesses of the films, in nanometers, are indicated under each of them):

$glass^{(1)}/SnO_2^{(2)}/SiO_2^{(3)}/Nb_2O_5^{(4)}$/A film$^{(5)}$
   19    29    117    84

Films 2, 3 and 4 are respectively obtained from tin, doped-silicon and niobium targets in the presence of oxygen.

The A film, with formula $Al_xO_yF_z$ is obtained from an aluminium target, in the presence of oxygen and $CF_4$ (other fluorinated gases may be used in combination with or in place of $CF_4$, for example $C_2F_4$). The $CF_4$ level is adjusted to obtain a film with a refractive index of about 1.37. The light reflection factor $R_L$, based on the $D_{65}$ illuminant, measured on the coated substrate is 0.80%. The values of $a^*_{(R)}$ and $b^*_{(R)}$ in reflection according to the (L*, a*, b*) colorimetry system are respectively about −3 and −1. The deposition rate of the A film is much greater than that of the silica film 3.

EXAMPLE 2

This example uses a four-film coating which this time employs two A films, in the following sequence (same conventions, as in all the examples glass$^{(1)}$/SnO$_2$$^{(2)}$/A Film$^{(3)}$/Nb$_2$O$_5$$^{(4)}$/A Film$^{(5)}$
        21      23      115      85

These films are obtained as in the previous example, and the A films have an index of about 1.37. The coated substrate has an R$_L$ value of 0.96%, and a* and b* values of respectively about −3 and −1.

EXAMPLE 3

A similar stack to example 2 is used, but the "outer" A film, numbered 5 in the figure, is this time deposited under conditions which lead to a refractive index of about 1.42, the other A film still having an index of about 1.37.

The A film of index 1.37 is obtained as before, this film therefore corresponding to the formula Al$_x$O$_y$F$_z$.

The A film of index 1.42 is obtained using a target which is no longer made of pure aluminium, but of aluminium-silicon alloy with a low silicon content This film therefore corresponds to the formula Al$_x$O$_y$F$_z$Si$_t$. The sequence is as follows:

glass$^{(1)}$/SnO$_2$$^{(2)}$/A Film$^{(3)}$/Nb$_2$O$_5$$^{(4)}$/A Film$^{(5)}$
        20      27      117      84

The coated substrate has an R$_L$ value of 0.80%, and a* and b* values of respectively about −3 and −1.

A second example series was carried out with tungsten oxide in film 4 and tin oxide in film 2: the films are fabricated as before, the tungsten oxide being deposited by reactive sputtering of a metallic tungsten target in the presence of oxygen.

EXAMPLE 4

A stack is used with the following sequence:

glass$^{(1)}$/SnO$_2$$^{(2)}$/A Film$^{(3)}$/WO$_3$$^{(4)}$/A Film$^{(5)}$
        18      33      126      92

The first A film$^{(3)}$ has an index of about 1.37, and the second of about 1.42. They are obtained as in Example 3. The coated substrate has an R$_L$ value of about 0.33%, with a* and b* values in reflection of respectively about −3 and −1.

EXAMPLE 5

A stack is used with the following sequence:

glass$^{(1)}$/SnO$_2$$^{(2)}$/SiO$_2$$^{(3)}$/WO$_3$$^{(4)}$/A film$^{(5)}$
        17      36      125      92

The A film has an index of about 1.42, and, as in Example 3, is obtained from an Al/Si metal alloy target. The coated substrate has an R$_L$ value of about 0.35%, and a* and b* values of respectively about −3 and −1.

One example was carried out with titanium oxide for film 4 and tin oxide for film 2:

EXAMPLE 6

A stack is used with the following sequence:

glass$^{(1)}$/SnO$_2$$^{(2)}$/SiO$_2$$^{(3)}$/TiO$_2$$^{(4)}$/A film$^{(5)}$
        26      34      108      95

The A film here has an index of 1.37 and is obtained as in Example 1. The coated substrate has an R$_L$ value of about 0.90%, and a* and b* of values of still respectively about −3 and −1.

According to a second embodiment, the anti-reflection coating containing at least one A film according to the invention is designed so that the high-index oxide film 4 is in fact an "overall" film consisting of the superposition of two or three high-index oxide films.

EXAMPLE 7

A stack with 5 films in the following sequence is used:

glass$^{(1)}$/SnO$_2$$^{(2)}$/A film$^{(3)}$/[Nb$_2$O$_5$/SnO$_2$]$^{(4)}$/A film$^{(5)}$
        22      30      106      22      80

The first A film$^{(3)}$ has an index of about 1.37, and the second A film$^{(5)}$ has an index of about 1.42. They are obtained as in Example 3.

The coated substrate has an R$_L$ value of about 0.50% and a* and b* values in reflection of respectively about −3 and −1.

It is also possible to substitute the Nb$_2$O$_5$ in this stack by, in particular, a TiO$_2$ or Bi$_2$O$_3$ film.

EXAMPLE 8

A stack with 6 films in the following sequence is used:

glass$^{(1)}$/SnO$_2$$^{(2)}$/A film$^{(3)}$/[Nb$_2$O$_5$/SnO$_2$/Nb$_2$O$_5$]$^{(4)}$/A film$^{(5)}$
        26      26      65      28      23      94

The two A films$^{(3)}$ and $^{(5)}$ have an index of 1.37 and are obtained as in Example 4.

The coated substrate has an R$_L$ value of about 0.52%, and a* and b* values in reflection of respectively about −3.1 and −1.2.

Here again, the [Nb$_2$O$_5$/SnO$_2$/Nb$_2$O$_5$] sequence may be substituted by the sequence [Bi$_2$O$_3$/SnO$_2$/Bi$_2$O$_3$] or [TiO$_2$/SnO$_2$/TiO$_2$].

Lastly, comparative examples were carried out using anti-reflection coatings employing exclusively SiO$_2$ films for the low-index film.

A last example according to the invention was carried out with an anti-reflection coating in which the first sequence of high- and low-index films (2, 3) is replaced by an intermediate-index film (7):

EXAMPLE 9

A stack with three films in the following sequence is used:

glass$^{(1)}$/mixed Al and Sn oxide$^{(7)}$/WO$_3$$^{(4)}$/A film$^{(5)}$
index 1.8           index 1.37
\55 nm           113 nm           89 nm The mixed oxide film$^{(7)}$ is obtained by reactive sputtering in the presence of oxygen from an Al/Sn target. The A film$^{(5)}$ is obtained as in Example 4.

The coated substrate has an R$_L$ value of 0.66%, and a* and b* values in reflection of respectively −3.1 and −1.1.

COMPARATIVE EXAMPLE 10

This is comparable to Example 1, since it uses the same sequence, replacing the film 5 by a silica film. The stack is therefore as follows:

glass$^{(1)}$/SnO$_2$$^{(2)}$/SiO$_2$$^{(3)}$/Nb$_2$O$_5$$^{(4)}$/SiO$_2$$^{(5)}$
21           34           119           85

The R$_L$ value of the coated substrate is 0.55%.

The following conclusions can be drawn from this set of results: incorporating films of the A type in the anti-reflection stacks is advantageous: the production cycle time can be reduced very substantially by employing these fluorinated films rather than silica films.

This substitution is not accompanied by any drawback in terms of the properties of the stack, more particularly the optical properties: the A films, with adjustable index, make it possible to obtain very low R$_L$ values, at least as low as with silica films. They also make it possible to obtain a very pale green-blue appearance in reflection, which tint is currently highly desirable.

The thicknesses of each of the films were actually selected, more particularly the thicknesses of the A films, in order to obtain this colorimetry in conjunction with a low light reflection factor value. It is clear that modifying the thicknesses of these films, in particular by ±20% relative to the thicknesses indicated, in particular with the aim of obtaining a slightly different colorimetry in reflection, would not depart from the scope of the invention.

Furthermore, the use, as in Example 3, of an "exterior" A film made of fluorinated alumina additionally containing a small amount of silica. provides two advantages: this allows finer adjustment of the index of the film, and it increases the chemical resistance of the film compared to a film consisting of only silica or only fluorinated alumina.

This is beneficial when the substrate may be incorporated in glazing with the film stack facing the exterior (damage due to the weather) or the interior (damage due to abrasive cleaning).

A test furthermore demonstrated good mechanical durability:

An A film according to the invention, with an index of 1.42, consisting of a mixture of aluminium oxyfluoride and silica, and with a thickness of 100 nm, was deposited directly on a glass substrate. This substrate was subjected to the so-called Taber Abrasion Test, which test is carried out using wheels made of abrasive powder embedded in an elastomer. The machine is manufactured by the company Taber Instrument Corporation in the United States. It is the model 174 "Standard Abrasion Tester", and the wheels are of the CS10F type loaded with 500 grams. The light transmission factor TL based on the D$_{65}$ illuminant and the blurring level F (diffuse light transmission) were measured at the start, then after 150, 350 and 650 turns. The result is given in the following table:

| Number of turns | TL (%) | F (%) |
|---|---|---|
| 0 | 92.2 | 1.32 |
| 150 | 92.4 | 2.18 |
| 350 | 93.6 | 2.74 |
| 650 | 91.6 | 2.68 |

It is indeed observed that the variations in T$_L$ and blur F are small.

We claim:

1. An article comprising:
   a transparent substrate having opposite faces; and
   an anti-reflection coating comprising two or more adjacent dielectric films disposed over at least one of the faces, said coating containing an alternating sequence of adjacent films having high and low refractive indices with at least one of the films having a low refractive index being positioned as an outermost layer of the coating and comprising (1) an aluminum fluoride or aluminum oxyfluoride material, wherein the aluminum material has an O/F atomic ratio of less than 10, and (2) at least one oxide component selected from the group consisting of silicon oxide, tin oxide, nickel oxide and mixtures thereof.

2. The article according to claim 1, wherein each low-refractive index film in the anti-reflection coating comprises aluminum fluoride.

3. The article according to claim 1, wherein each film having the high refractive index has an index of at least 1.80 and comprises compounds selected from the group consisting of tungsten oxide, tin oxide, zinc oxide, aluminum nitride, silicon nitride, tantalum oxide, niobium oxide, titanium oxide, bismuth oxide, zirconium oxide, cerium oxide, and mixtures thereof.

4. The article according to claim 1, wherein each film having the high refractive index has an index of at least 2.25 and comprises compounds selected from the group consisting of niobium oxide, titanium oxide, bismuth oxide, zirconium oxide, cerium oxide, and mixtures thereof.

5. The article according to claim 1, wherein the difference in refractive index between two adjacent films having high and low refractive indices is at least 0.5.

6. The article according to claim 1, wherein the anti-reflection coating further comprises a film having a refractive index of between 1.65 and 1.80 disposed between the substrate and the alternating sequence of films.

7. The article according to claim 1, wherein the coating adjacent to the outermost layer comprises two to three films having high refractive indices having at least one film comprising niobium oxide, bismuth oxide, or tungsten oxide.

8. The article according to claim 7, wherein the anti-reflection coating is also an anti-static coating and at least one film in the coating adjacent to the outermost layer comprises a doped metal oxide conductive material.

9. The article according to claim 1, wherein an anti-reflection coating is disposed on each of the faces.

10. The article according to claim 1, further comprising a luminous reflectance (R$_L$) of at most 2%, and a blue or blue-green color in reflection with negative a* value of at most 3.5 and negative b* value of at most 1.5.

11. The article according to claim 1, wherein the coating further comprises a low-emissivity film comprising silver, aluminum, a $SnO_2$:F doped metal oxide, or a tin-doped indium oxide, said low-emissivity film being disposed over at least one film with aluminum fluoride or aluminum oxyfluoride.

12. The article according to claim 1 wherein; the oxide component comprises silicon oxide and the oxide component and aluminum material have a Si/Al atomic ratio of between 0.05 and 1.00, an O/F atomic ratio between 0.2 and 10, and a F/Al atomic ratio of between 0.1 and 2.5.

13. An article comprising:

a transparent substrate having opposite faces; and an anti-reflection coating comprising adjacent dielectric films disposed over at least one of the faces, said coating containing an alternating sequence of adjacent films having high and low refractive indices, wherein said coating includes a plurality of films comprising a first film including a tin oxide, a second film including a silicon oxide, a third film including at least one of a niobium oxide, a tin oxide, a tungsten oxide, a bismuth oxide, or a titanium oxide, and a fourth film including an aluminum fluoride having a low refractive index being positioned as an outermost layer of the coating.

14. An article comprising:

a transparent substrate having opposite faces; and an anti-reflection coating comprising two or more adjacent dielectric films disposed over at least one of the faces, said coating containing an alternating sequence of adjacent films having high and low refractive indices, wherein said coating includes a plurality of films comprising a first film including a tin oxide, a second film includes an aluminum fluoride or an aluminum oxyfluoride, a third film including at least one of a niobium oxide, a tin oxide, a tungsten oxide, a bismuth oxide, or a titanium oxide, and a fourth film including an aluminum fluoride.

* * * * *